United States Patent
Sandner

(10) Patent No.: US 9,322,465 B2
(45) Date of Patent: Apr. 26, 2016

(54) GEAR SYSTEM

(71) Applicant: Miba Sinter Austria GmbH, Laakirchen (AT)

(72) Inventor: Christian Sandner, Gmunden (AT)

(73) Assignee: Miba Sinter Austria GmbH, Laakirchen (AT)

( * ) Notice: Subject to any disclaimer, the term of this patent is extended or adjusted under 35 U.S.C. 154(b) by 111 days.

(21) Appl. No.: 13/960,992

(22) Filed: Aug. 7, 2013

(65) Prior Publication Data

US 2014/0116174 A1    May 1, 2014

(30) Foreign Application Priority Data

Oct. 25, 2012   (AT) ................ A 1156/2012

(51) Int. Cl.
*F16H 55/18* (2006.01)
*F16H 57/12* (2006.01)

(52) U.S. Cl.
CPC .............. *F16H 55/18* (2013.01); *F16H 57/12* (2013.01); *F16H 2057/126* (2013.01); *F16H 2057/127* (2013.01); *Y10T 74/19898* (2015.01)

(58) Field of Classification Search
CPC ..... F16H 57/12; F16H 55/18; F16H 57/0006; F16H 55/06; F16H 55/14; F16H 2057/128; F16H 55/24; B23Q 5/56; B24B 47/28
USPC ............. 74/409, 411, 412 R, 421 R, 440, 443
See application file for complete search history.

(56) References Cited

U.S. PATENT DOCUMENTS

| | | | |
|---|---|---|---|
| 1,449,903 A | | 3/1923 | Leow |
| 1,648,715 A | * | 11/1927 | Bean ................. F16H 55/18 74/440 |
| 2,310,232 A | | 2/1943 | Hale |
| 2,343,110 A | * | 2/1944 | Hale ................. 74/440 |
| 2,440,901 A | * | 5/1948 | Larson ............. F16H 55/18 346/139 R |
| 3,359,819 A | * | 12/1967 | Veillette et al. .......... 74/409 |
| 4,184,380 A | * | 1/1980 | Rivin ...................... 74/461 |
| 4,899,608 A | * | 2/1990 | Knappe et al. .......... 74/411 |
| 4,947,707 A | * | 8/1990 | Koenneker ........ 464/68.1 |

(Continued)

FOREIGN PATENT DOCUMENTS

| | | |
|---|---|---|
| EP | 0 079 184 A1 | 5/1983 |
| JP | 57204365 A  * | 12/1982 |

(Continued)

OTHER PUBLICATIONS

G. Niemann, H. Winter: Maschinenelemente, Band II, Getriebe allgemein, Zahnradgetriebe—Grundlagen, Stirnradgetriebe, Springer Verlag, 1989, p. 365-368, total of 6 pages.

*Primary Examiner* — William Kelleher
*Assistant Examiner* — Bobby Rushing, Jr.
(74) *Attorney, Agent, or Firm* — Collard & Roe, P.C.

(57) ABSTRACT

The invention relates to a gear system (1) comprising a main gear (2) and a gear (4) rotatable relative thereto in circumferential direction (3), comprising spring elements (8), by means of which the rotatable gear (4) is pretensioned in circumferential direction (3) against the main gear (2), wherein the spring elements (8) are connected on the one hand to the main gear (2) and on the other hand to the rotatable gear (4), and wherein the spring elements (8) each have a longitudinal middle axis (19) running obliquely relative to an axial end face (18) of the rotatable gear (4).

10 Claims, 2 Drawing Sheets

(56) References Cited

U.S. PATENT DOCUMENTS

| | | | |
|---|---|---|---|
| 5,056,613 A * | 10/1991 | Porter et al. | 180/178 |
| 5,630,491 A * | 5/1997 | Ament et al. | 192/70.17 |
| 5,870,928 A * | 2/1999 | Genter et al. | 74/440 |
| 6,021,686 A * | 2/2000 | Mizoguchi | 74/440 |
| 6,386,060 B1 * | 5/2002 | Epshteyn | 74/440 |
| 7,383,750 B2 * | 6/2008 | Menjak et al. | 74/409 |
| 2009/0000895 A1 * | 1/2009 | Inomori et al. | 192/31 |

FOREIGN PATENT DOCUMENTS

| | | | | |
|---|---|---|---|---|
| JP | 08093886 A | * | 4/1996 | ............ F16H 55/18 |
| JP | H08-240258 A | | 9/1996 | |
| JP | 2009103279 A | * | 5/2009 | |
| JP | 2010125927 A | * | 6/2010 | |
| JP | 2013215788 A | * | 10/2013 | |
| KR | 101351500 B | * | 1/2014 | ............ B24B 41/00 |
| KR | 10-1395618 | * | 5/2014 | |
| WO | WO 2005051613 A1 | * | 6/2005 | ............ B25J 17/00 |

* cited by examiner

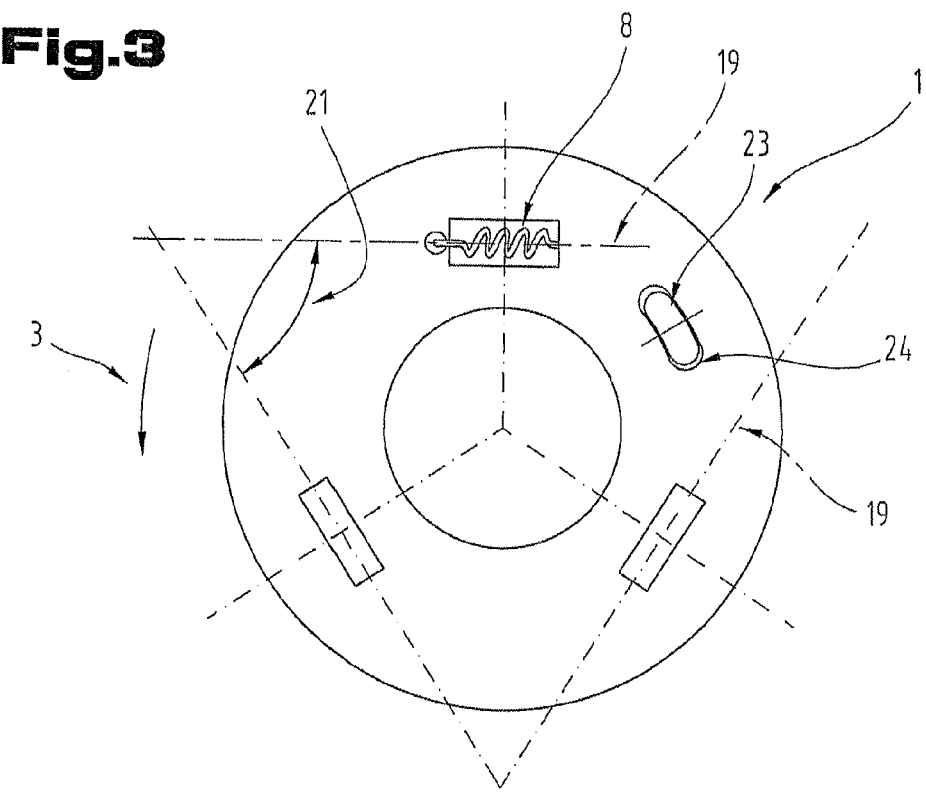
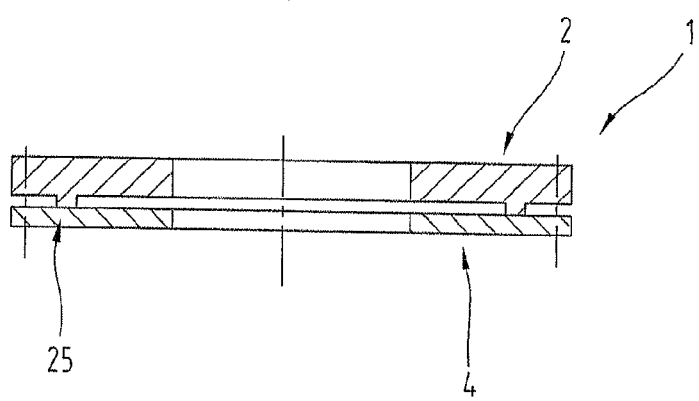
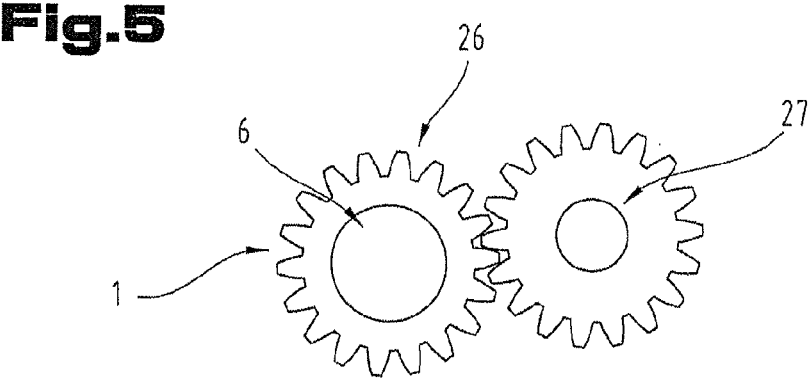

GEAR SYSTEM

CROSS REFERENCE TO RELATED APPLICATIONS

Applicant claims priority under 35 U.S.C. §119 of Austrian Application No. A 1156/2012 filed on Oct. 25, 2012, the disclosure of which is incorporated by reference.

The invention relates to a gear system comprising a main gear and a gear rotatable relative thereto in circumferential direction, with spring elements by means of which the rotatable gear is pretensioned in circumferential direction against the main gear, wherein the spring elements are connected on the one hand to the main gear and on the other hand to the rotatable gear. The invention also relates to a gear train comprising a first gear and a second gear, the first gear being arranged without play on a shaft.

From the prior art various different designs of so-called "split gears" are already known. The purpose of these gear configurations is to reduce tooth flank play in intermeshing gear wheels.

From "G. Niemann, H. Winter: Maschinenelemente, Band II, Getriebe allgemein, Zahnradgetriebe-Grundlagen, Stirnradgetriebe, Springer Verlag, 1989, page 366" a split gear of this kind is known comprising a main gear and a rotatable gear arranged thereon. The two gear wheels are connected to one another by two spiral springs, wherein the longitudinal middle axes are aligned by the spiral springs perpendicular to the shaft supporting the gear and thereby the helical springs are aligned parallel to the axial end face.

A gear system of this kind is also known from EP 0 079 184 A1. This gear system is part of a gear train with three gear wheels, which are arranged respectively on an axis. To enable the play-free transmission of torques in this arrangement two such gear systems had to be installed. To avoid this in the gear train according to this EP-A1 the split gear is arranged with radial play on its shaft. Thus the click wheel with the tooth flanks is supported on the two mating gears and in this way enables a play-free torque transmission. As the click wheel is configured to be radially movable, said split gear is only suitable for three-shaft arrangements of gear trains and only for small loads. For this reason said gear system is also provided only for the writing head of an electric typewriter.

The objective of the present invention is to simplify the aforementioned gear system for the transmission of large torques which typically occur in e.g. motor vehicles.

Said objective of the invention is achieved on the one hand by the aforementioned gear system in that the spring elements each have a longitudinal middle axis, arranged running obliquely to an axial end face of the rotatable gear, and on the other hand by the aforementioned gear train in that one of the gear wheels is configured according to the invention.

It is an advantage in this case that by means of the oblique position of the spring elements in addition to tensioning in circumferential direction tensioning is also applied in axial direction at the same time. On the basis of the axial force component of the rotatable gear (i.e. the tensioning gear) an improvement in the axial run-out of the gear system can be achieved. In this way compared to the single spring systems the one-sided support of the bore surface of the rotatable gear is avoided more effectively, whereby wear can be reduced. Furthermore, it is possible in this way to simplify the geometry of the main gear and/or the rotatable gear, whereby the production can also be more inexpensive. Furthermore, by means of the axial force a damping friction moment can be produced, whereby the vibrations of the rotatable gear are damped. The damping can also reduce the power dissipation during operation. By means of the simpler structure compared to similar gear systems of the prior art the space required by the gear system in axial direction can also be reduced, as no additional axial securing means are required.

To improve these effects according to one embodiment variant the longitudinal middle axes of the spring elements run at an angle to the axial end face, which is selected from a range with a lower limit of 3° and an upper limit of 80°. At angular positions of the spring elements outside this range the aforementioned effects can still be observed, but in the preferred angle range an improvement is achieved with respect to the axial component of the produced force and thereby an improved fit of the gear system on a shaft.

It is also possible that the longitudinal middle axes projected onto the plane of the axial end face of the rotatable gear by means of the spring elements are arranged at an angle to one another which is not equal to 90° or a whole number multiple of 90°. The advantage of this is the better adjustability of the acting force components of the spring elements.

According to a preferred embodiment variant of the gear system at least two, in particular at least three or four spring elements are provided. In this way a better alignment of the rotatable gear can be achieved in relation to the main gear.

Preferably, the spring elements are in the form of helical springs. In this way a simple assembly of the gear system is possible in which the springs are simply mounted and the rotatable gear is rotated, until a possibly provided stop locks into place. Furthermore, by using various different helical springs with different spring characteristics the pretensioning force can be varied in broad ranges without the required installation space of the gear system being influenced substantially.

Although it is not absolutely necessary for the invention (this is a further advantage for simplifying the component) the main gear and/or the rotatable gear can comprise at least one axial stop for the rotatable gear or the main gear, whereby on the one hand it is possible to position the two gear wheels relative to one another and on the other hand to restrict the relative rotatability of the two gear wheels relative to one another in circumferential direction. The latter can also be used as a safety measure in case a spring breaks.

The rotatable gear can bear partly in one area against the main gear, whereby in this area the main gear and/or the rotatable gear is or are provided with a friction-altering coating. In this way the friction moment, which is produced on the basis of the axial force component of the springs, as explained above, can be influenced so that by means of this coating the damping between the two gear halves can also be adjusted.

The term "friction-altering" relates to the friction of the main material from which the main gear and/or the rotatable gear is or are made.

It is also possible for individual spring elements to have a different spring characteristic from the remaining spring elements and/or to be arranged at a different angle of the longitudinal middle axes to the axial end face. In this way the load torque acting between the main gear and the rotatable gear can be adjusted more effectively, in particular relatively small load torques of for example 2 Nm can be achieved in this way.

For a better understanding of the invention the latter is explained in more detail with reference to the following Figures.

In a schematically simplified representation:

FIG. 3 shows an embodiment variant of a gear system viewed in axial direction;

FIG. 4 shows a cross section of the gear system according to FIG. 2;

FIG. 5 shows a gear train.

Figure 1:
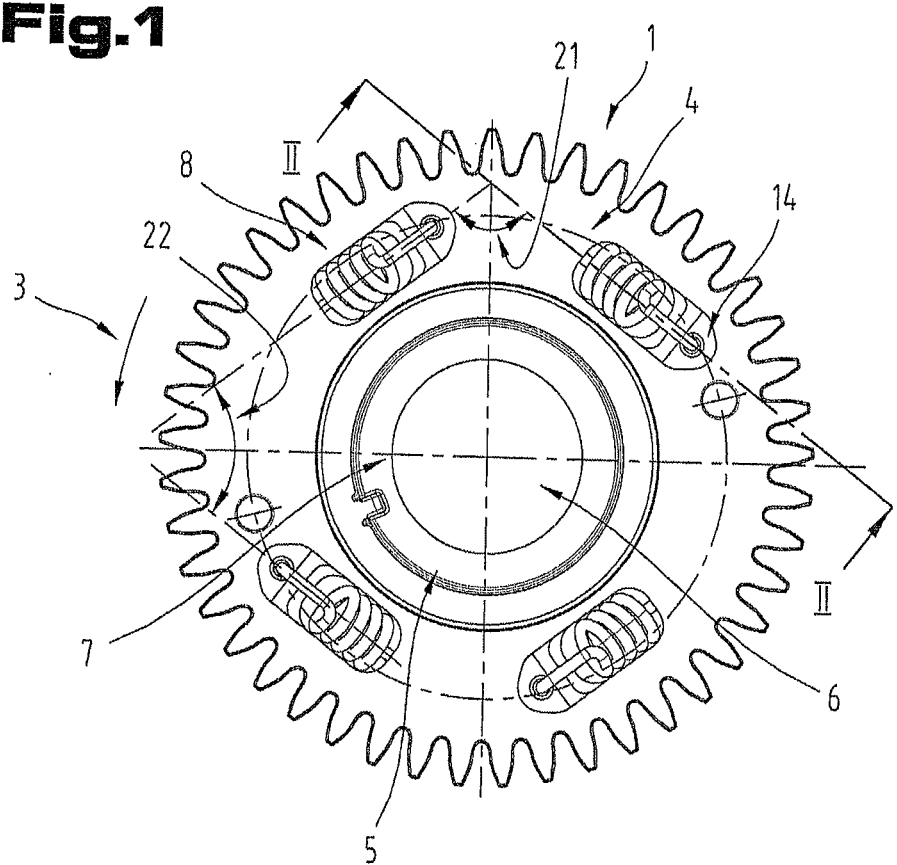
FIG. 1 shows a gear system viewed in axial direction.

First of all, it should be noted that in the variously described exemplary embodiments the same parts have been given the same reference numerals and the same component names, whereby the disclosures contained throughout the entire description can be applied to the same parts with the same reference numerals and same component names. Also details relating to position used in the description, such as e.g. top, bottom, side etc. relate to the currently described and represented figure and in case of a change in position should be adjusted to the new position.

Figure 2:
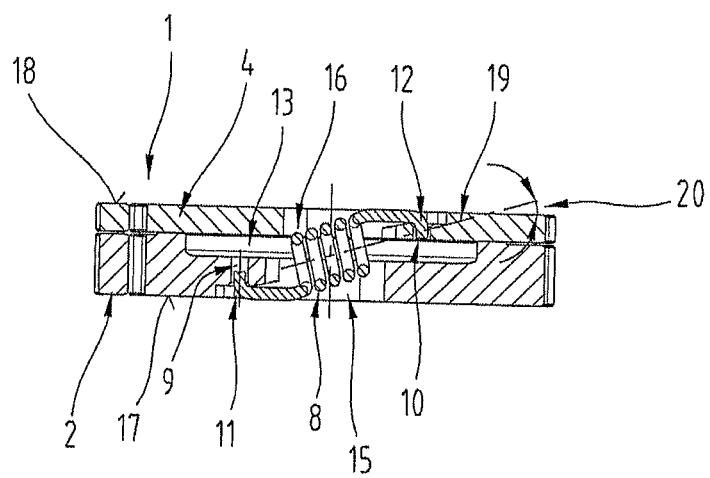
FIG. 2 shows a cross section of the gear system according to FIG. 1 along the line II-II in FIG. 1.

FIGS. 1 and 2 show a gear system 1. Said gear system 1, also known as a "split-gear", comprises a main gear 2 and a gear 4 rotatable relative thereto in a circumferential direction 3. The main gear 2 can comprise a hub 5, which can preferably be configured in one piece with the main gear 2. It is also possible however that both the main gear 2 and the rotatable gear 4 are arranged directly on a common shaft 6 (FIG. 4).

The rotatable gear 4 is arranged rotatably on the hub 5 or the shaft 6 (FIG. 4) of the main gear 2 or the shaft 6 (FIG. 4).

If the main gear wheel 2 comprises the hub 5, a recess 7 in the form of bore is formed in the latter for mounting the shaft 6.

The rotatable gear 4 is pretensioned by means of spring elements 8 in circumferential direction 3 relative to the main gear 2. In the shown, preferred embodiment variant of the gear system 1 four spring elements 8 are provided. However, also only three or more than four, for example, five, six etc. spring elements 8 can be provided. In any case there are at least two spring elements 8.

Each of the spring elements 8 is connected on the one hand to the main gear 2 and on the other hand to the rotatable gear 4. For this said spring elements 8 in the simplest embodiment variant of the gear system 1 are suspended respectively in a recess 9 in the main gear 2 and a recess 10 in the rotatable gear 4 with first and second bent spring end sections 11, 12 having first and second spring end faces, respectively—the spring elements 8 are in the form of tension springs—as shown in particular in FIG. 2. The spring end sections 11, 12 each point to the inside of the gear system 1, i.e. in the direction of the respective other part gear. The recesses 9, 10 can be formed for example by bores on webs 13, 14 projecting in the direction of the spring elements 8 on the main gear 2 and on the rotatable gear 4. Other forms and types are possible for the recesses 9, 10.

Other types of fastening are possible however, for example the spring elements 8 can be welded to the main gear 2 and the rotatable gear 4.

Furthermore, the main gear 2 and the rotatable gear 4 comprise recesses 15, 16 (in particular openings), in which the spring elements 8 are partly mounted respectively, whereby in the assembled state the spring elements 8 preferably do not project over an outer, axial end face 17 of the main gear and an outer, axial end face 18 of the rotatable gear 4, even though this is possible. Said recesses 15, 16 can be configured to be at least approximately rectangular with possibly rounded corners. Other forms are also possible however.

In the assembled state of the gear system 1 the recesses 15, 16 are arranged preferably in axial direction of the gear system not to be aligned with one another, as shown in FIG. 2. It is thus possible to make said recesses 15, 16 smaller. In principle it is possible however for the recesses 15, 16 to be of equal size and to have the same shape.

By means of the type of connection of the spring elements 8 with the main gear 2 and the rotatable gear 4 longitudinal middle axes 19 run obliquely through the spring elements 8 (shown by a broken line in FIG. 2), i.e. at an angle 20 to the axial end face 18 of the rotatable gear 4 (or to the axial end face 17 of the main gear 2).

The angle 20 is in this case preferably selected from a range of +3° to +80°, in particular from a range of +10° to +70°, or from a range of −3° to −80°, in particular from a range of −10° to −70°. With respect to the different signs in front of the angles reference is made to the following explanation.

The arrangement of the spring elements 8 in the gear system 1 can be such that in circumferential direction 3 alternately a connection with the main gear 2 follows a connection with the rotatable gear 4, as shown in FIG. 1. In this embodiment variant there is thus no change in the direction of installation.

According to another embodiment however a reverse direction of installation can be an advantage. By means of this arrangement of the spring elements 8, in which at least one spring element 8 is inclined in a different direction from the remaining spring elements 8 (relative to the end face 18), so that in circumferential direction 3 at least one connection of a spring element 8 with the main gear 2 follows a connection of an additional spring element 8 with the main gear 2, different torques are produced which do not add up but subtract in circumferential direction, or since at least one of the load torques produced by the spring elements 8 is negative, relative to the additional load torques, a total load torque formed by the spring elements 8 in circumferential direction is produced which is smaller than the total load torque produced when all of the spring elements 8 are inclined in the same direction. It is thus possible for the size of the desired load torque to be adjusted more effectively. In axial direction the spring forces also add up in this embodiment variant, so that even with smaller torques in circumferential direction a corresponding tensioning is maintained in axial direction.

Preferably, this embodiment variant is applied when an even number of spring elements 8 are arranged in the gear system 1, so that for example two spring elements 8 are inclined in one direction and two spring elements 8 are inclined in the other direction. It is preferable if two opposite spring elements 8 are inclined in the same direction so that the direction of inclination of the spring element 8 alternates in circumferential direction 3.

In a particular embodiment variant the angles of inclination (=angle 20) of the spring elements 8 are equal, but the value of the angle of inclination of at least one spring element 8 is positive and the value of the angle of inclination of at least one further spring element 8 is negative, in relation to a respective reference point. In order to produce a total load torque from the spring elements 8 the spring characteristic of at least some individual spring elements 8 differs from other spring elements 8, in particular the spring constant. It is preferable to have an arrangement of the spring elements 8 that alternates in circumferential direction so that in circumferential direction a spring element 8 with a higher spring constant follows a spring element with a comparatively lower spring constant. For example, in an arrangement of four spring elements 8 in the gear system 1 the arrangement is such that in circumferential direction the sequence of larger spring constant—to smaller spring constant—higher spring constant (in particular the same as the first spring constant in this sequence)—smaller spring constant (in particular as low as the second spring constant in this sequence).

In this way a combination of so-called hard spring elements 8 with soft spring elements 8 is possible in the gear system 1.

The softer spring stores with equal load more energy than the hard one. If the deformation is specified the hard spring absorbs more energy.

In particular, this embodiment variant is selected for setting a low load torque. In this case the spring elements 8 with the lower spring constant work against the spring elements 8 with the higher spring constant so that the overall result is a smaller total load torque.

According to other embodiment variants also mixed variants can be provided in that on the one hand the spring characteristic and on the other hand the angle of inclination varies, wherein the latter is not necessarily negative in relation to other angles of inclination of the spring elements 8, and also only the size of the angle of inclination is different, for example one spring element 8 has an angle of inclination of 3° and another spring element 8 has an angle of inclination of 5°.

The spring elements 8 are installed in the shown embodiment variant of the gear system 1 such that the longitudinal middle axes 19 projected onto the plane of the axial end face 18 of the rotatable gear are arranged by the spring elements 8 at an angle 21 or 22 relative to one another, which is not equal to 90° or is a whole number multiple thereof. However, embodiments of the gear system 1 are also possible in which this angle 21 or 22 is 90°.

As embodiment variants with only two spring elements 8 are also possible it should be noted that in a special embodiment variant the two longitudinal middle axes 19 are arranged parallel to one another by means of the spring elements 8.

In the embodiment variant with four spring elements 8 the angle 21 can preferably be selected from a range of 95° to 140°, in particular from a range of 95° to 110°. The complementary angle 22 has corresponding values.

In general the angle 21 can be selected from a range of 60° to 180°, in particular from a range of 95° to 130°. The complementary angle 22 has corresponding values. Generally, the angle 21 conforms to the number of spring elements 8 provided.

By means of angle 20 (the so-called spring position angle) the axial force component of the spring elements 8 can be influenced, whereby the size of the axial tensioning of the rotatable gear 4 can be adjusted in relation to the main gear 2.

The spring elements 8 are preferably in the form of helical tension springs. In principle however other spring elements 8 can also be used.

Preferably, the spring elements 8 are made from spring steel.

FIGS. 3 and 4 show an embodiment variant of the gear system 1, in which for the same parts the same reference numbers and reference names are used as in the preceding FIGS. 1 and 2. To avoid unnecessary repetition reference is made to the detailed description relating to the preceding FIGS. 1 and 2.

In contrast to the preceding embodiment variant of the gear system 1 three spring elements 8 are arranged in the latter, the connection with the main gear 2 and the rotatable gear 4 being formed in the manner described above.

The angle 21 between the projected longitudinal middle axes 19 is at least almost 60° in this embodiment variant.

FIG. 3 shows a further embodiment variant of the gear system 1. It is possible, although not absolutely necessary owing to the axial tensioning of the rotatable gear 4, that on the rotatable gear 4 at least one axial projection 23 (axial stop) is formed—there can also be more than one, e.g. two or three—which extends in the direction of the main gear 2 and the latter is mounted at least partly in a recess 24. By means of this axial projection 23, which is preferably formed in one piece with the rotatable gear 4, the rotatability of the rotatable gear 4 is restricted in circumferential direction 3.

However, a reverse arrangement is also possible in that the at least one axial projection 23 is formed on the main gear 2 and the at least one recess 24 is formed in the rotatable gear.

Furthermore, FIG. 4 shows that it is possible that the rotatable gear 4 bears in an area 25 only partly against the main gear 2. This area 25 can be in the form of at least one annular web for example, which is arranged on the main gear 2 (and/or on the rotatable gear 4). By means of this configuration a better guiding or better positioning of the rotatable gear 4 on the main gear 2 is achieved.

It is possible in this case that at least one of the contacting surfaces of the area 25 and the rotatable gear 4 (or the main gear 2) is or are provided with a friction-reducing coating, for example a bonded coating, e.g. made of PTFE.

Moreover, it is also possible that in this bearing area the friction is increased specifically by a friction-increasing coating, for example by a coating comprising friction particles (corundum, quartz, etc.).

For the sake of completion FIG. 5 shows a gear train 26 known in principle from the prior art with two meshing gears, wherein one of the gears is formed by the gear system 1 according to the invention. Both the gear system 1 and the additional gear are fixed in a non-rotational manner and without play on a shaft 6, 27 respectively.

The zero-load assembly of the gear system 1 with the mating gear of a gear train can be performed e.g. by means of a pin or splint, which engages in corresponding recesses in the main gear 2 and in the rotatable gear 4 and is removed again after assembly.

By means of the position of the spring elements 8 it is also possible to adjust the axial pretensioning within certain limits.

Lastly, it should also be noted that the main gear 2 and/or the rotatable gear 4 are preferably made from sintered steel, wherein the latter can also be made in the form of a stamped part, particularly the rotatable gear 4.

The exemplary embodiments show possible embodiment variants of the gear system 1.

Finally, as a point of formality, it should be noted that for a better understanding of the structure of the gear system 1, the latter and its components have not been represented true to scale in part and/or have been enlarged and/or reduced in size.

| List of Reference Numerals | |
|---|---|
| 1 | gear system |
| 2 | main gear |
| 3 | circumferential direction |
| 4 | gear |
| 5 | hub |
| 6 | shaft |
| 7 | recess |
| 8 | spring element |
| 9 | recess |
| 10 | recess |
| 11 | spring end section |
| 12 | spring end section |
| 13 | web |
| 14 | web |
| 15 | recess |
| 16 | recess |
| 17 | end face |
| 18 | end face |
| 19 | longitudinal middle axis |
| 20 | angle |
| 21 | angle |
| 22 | angle |
| 23 | axial projection |

-continued

| List of Reference Numerals | |
| --- | --- |
| 24 | recess |
| 25 | area |
| 26 | gear train |
| 27 | shaft |

The invention claimed is:

1. A gear system comprising a main gear, a gear rotatable relative thereto in circumferential direction, and spring elements in the form of helical tension springs, the rotatable gear being pretensioned in circumferential direction against the main gear via the spring elements, the spring elements being connected on the one hand to the main gear and on the other hand to the rotatable gear, wherein the spring elements each have a longitudinal middle axis which is arranged obliquely relative to an axial end face of the rotatable gear so that the rotatable gear is pretensioned in an axial direction against the main gear, wherein the rotatable gear bears in an area only partly against the main gear, wherein said area is in the form of at least one annular web arranged on the main gear or arranged on the rotatable gear, wherein each of the spring elements has a respective first bent spring end section with a respective first spring end face and has a respective second bent spring end section with a respective second spring end face, wherein each of the spring elements is connected to the main gear and the rotatable gear such that the respective first and second spring end faces point to the inside of the gear system, wherein the longitudinal middle axis of at least one of the spring elements runs at a first angle with respect to the axial end face, wherein the longitudinal middle axis of another spring element runs at a second angle with respect to the axial end face, and wherein the first angle is different from the second angle.

2. The gear system as claimed in claim 1, wherein the longitudinal middle axes of the spring elements run at an angle to the axial end face, which is selected from a range with a lower limit of ±10° and an upper limit of ±70°.

3. The gear system as claimed in claim 1, wherein the longitudinal middle axes of the spring elements which are projected onto the plane of the axial end face of the rotatable gear are arranged at an angle to one another which is not equal to 90° or a whole number multiple thereof.

4. The gear system as claimed in claim 1, wherein at least two, in particular at least three or four spring elements are provided.

5. The gear system as claimed in claim 1, wherein the main gear and/or the rotatable gear comprises or comprise at least one axial stop for the rotatable gear or the main gear.

6. The gear system as claimed in claim 1, wherein in said area the main gear and/or the rotatable gear are provided with a friction-altering coating.

7. The gear system as claimed in claim 1, wherein some of the spring elements have a different spring characteristic from the remaining spring elements.

8. A gear train comprising a first gear and a second gear, the first gear being arranged without play on a shaft, wherein the first gear is configured as a gear system as claimed in claim 1.

9. The gear system according to claim 1, wherein the main gear and the rotatable gear comprise recesses, wherein the spring elements are partly mounted respectively in the recesses, and wherein the spring elements do not project over an outer, axial end face of the main gear and an outer, axial end face of the rotatable gear.

10. The gear system according to claim 1, wherein at least one of the spring elements is inclined in a different direction from the remaining spring elements.

* * * * *